United States Patent
Richardson et al.

[11] Patent Number: 6,065,737
[45] Date of Patent: May 23, 2000

[54] TENSIONING DEVICE

[75] Inventors: Martin Edward George Richardson, Erdington; Peter Wellings, Sutton Coldfield, both of United Kingdom

[73] Assignee: Hydra-Tight Limited, United Kingdom

[21] Appl. No.: 09/207,377

[22] Filed: Dec. 8, 1998

[30] Foreign Application Priority Data

Dec. 9, 1997 [GB] United Kingdom ............ 9726092

[51] Int. Cl.$^7$ .................................................. E21B 19/00
[52] U.S. Cl. .................................. 254/29 A; 81/57.38
[58] Field of Search ..................... 254/29 A; 81/57.38

[56] References Cited

U.S. PATENT DOCUMENTS

| | | |
|---|---|---|
| 3,815,874 | 6/1974 | Jones . |
| 4,315,446 | 2/1982 | Orban . |
| 4,438,901 | 3/1984 | Reneau et al. . |
| 4,531,872 | 7/1985 | Warkotsh . |
| 4,569,258 | 2/1986 | Orban ........................... 254/29 A |

FOREIGN PATENT DOCUMENTS

| | | |
|---|---|---|
| 0 408 239 A1 | 1/1991 | European Pat. Off. . |
| 0 609 924 A1 | 8/1994 | European Pat. Off. . |
| 1 300 467 | 12/1966 | Germany . |
| 44 08 873 A1 | 9/1995 | Germany . |
| 1 233 974 | 6/1971 | United Kingdom . |
| 1 543 953 | 4/1979 | United Kingdom . |
| 2 143 608 | 2/1985 | United Kingdom . |
| 1 193 549 | 2/1988 | United Kingdom . |

*Primary Examiner*—David A. Scherbel
*Assistant Examiner*—Benjamin M. Halpern
*Attorney, Agent, or Firm*—Andrus, Sceales, Starke & Sawall

[57] ABSTRACT

An hydraulic, bolt tensioning device comprising a reaction component which in use bears against the member from which the bolt shank protrudes, the reaction component having a shank receiving bore extending therethrough, an annular, axially moveable component carried by said reaction component and moveable axially relative thereto by the introduction of hydraulic fluid under pressure between said components, a cam ring secured to said axially moveable component for axial movement therewith, and rotatable relative to said component about the axis thereof, and, a tensioning nut secured to said cam ring for movement therewith, said tensioning nut being divided into at least two relatively displaceable segments moveable relative to said cam ring between an open position in which the shank of a bolt to be tensioned can pass freely between said segments, and an operative position in which the thread portions on said segments mate with the thread of said bolt shank, said cam ring cooperating with said nut segments when said nut segments are engaged with a bolt shank and said axially moveable member is moved axially in a direction to tension the bolt shank, to load the segments radially inwardly to grip the bolt shank.

12 Claims, 3 Drawing Sheets

TENSIONING DEVICE

TENSIONING DEVICE

This invention relates to an hydraulic tensioning device for tensioning bolts, studs or similar elongate, externally screw-threaded, components. The term "bolt" is used herein to denote elongate externally screw-threaded components whether or not they have an integral head, and embraces bolts, studs, screw-threaded rods and the like.

It is known hydraulically to tension a bolt by stretching the bolt and then tightening a conventional nut of the bolt against the flange or surface from which the bolt shank protrudes. In this way the bolt can often be tensioned to a greater extent, and more conveniently, than can be achieved by rotating the nut relative to the bolt.

Conventional hydraulic tensioners include an actuator comprising a first component through which the shank of the bolt extends and which engages the surface from which the shank protrudes, the component affording access to the conventional clamping nut of the bolt adjacent said surface; a second component encircling said shank and moveable axially of the shank relative to the first component by the introduction of hydraulic pressure between the first and second components; and; a tensioning nut in screw-threaded engagement with the shank and moveable with said second component. The arrangement is such that when the second component is moved relative to the first component the tensioning nut moves with the second component thus stretching the bolt shank by an amount determined by the hydraulic pressure applied between the components. When a predetermined tension has been achieved in the bolt, the clamping nut is tightened to engage the surface from which the shank protrudes thereby maintaining the tension in the bolt and permitting the tensioning device to be removed.

Where the shank is relatively long then the existing apparatus is inconvenient in that the tensioning nut must be engaged with the free end of the shank and must be then rotated to screw it along the length of the shank to its operative point. This can take time, and may be particularly inconvenient for a diver working sub-sea. Our British Patent No 2193549 illustrates an hydraulic bolt tensioner in which the inconvenience is minimised by dividing the tensioning nut into diametric halves so that the tensioning nut can be assembled around the shank at the appropriate axial location, the two axial halves being clamped around the shank by a cam action derived from the axial loading applied to tension he bolt. The two halves of the nut may be hinged together so that the number of components to be handled by the operator is minimised, and European Patent No 0408239 illustrates an arrangement in which the two halves of a diametrically split tensioning nut are slidable towards and away from one another along the length of one or more link pins which prevent the two halves of the nut separating completely, and which incorporate latches for latching the two halves of the nut in an operative position relative to one another. In both cases the split tensioning nut, although being capable of being handled as a single component, is nevertheless separate from the remainder of the tensioning device, and thus must be handled separately by an operator.

In accordance with the present invention there is provided an hydraulic, bolt tensioning device comprising a reaction component which in use bears against the member from which the bolt shank protrudes, the reaction component having a shank receiving bore extending therethrough, an annular, axially moveable component carried by said reaction component and moveable axially relative there to by the introduction of hydraulic fluid under pressure between said components, a locking ring secured to said axially moveable component for axial movement therewith, and rotatable relative to said component about the axis thereof, and, a tensioning nut secured to said locking ring for movement therewith, said tensioning nut being divided into at least two relatively displaceable segments moveable relative to said locking ring between an open position in which the shank of a bolt to be tensioned can pass freely between said segments, and an operative position in which the thread portions on said segments mate with the thread of said bolt shank, said locking ring cooperating with said nut segments when said nut segments are engaged with a bolt shank to hold the segments in said operative position.

Preferably said locking ring is a cam ring, said cam ring cooperating with said nut segments when said nut segments are engaged with a bolt shank and said axially moveable member is moved axially in a direction to tension the bolt shank, to load the segments radially inwardly to grip the bolt shank.

Preferably there is provided means for retaining said nut segments in said operative position prior to the application of an hydraulic tensioning force.

Preferably said means comprises cooperating surfaces or said segments and said cam ring respectively.

Conveniently said cooperating surfaces are on the segment, and on axially extending members protruding from the cam ring.

Alternatively said means comprises a latch component secured to one segment and engageable with another segment when said segments are in their operative position.

One example of the invention is illustrated in the accompanying drawings, wherein.

Figure 1:
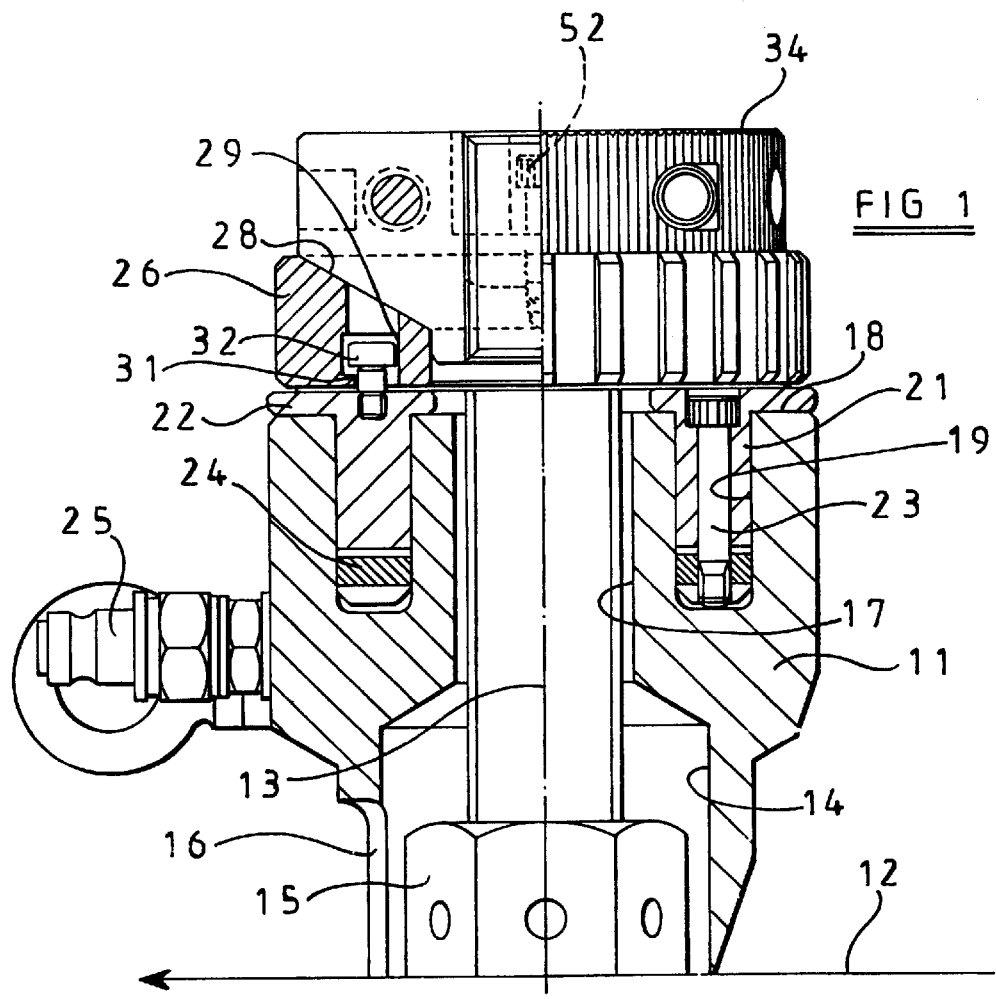
FIG. 1 is a composite sectional view of an hydraulic bolt tensioning device.
Figure 2:
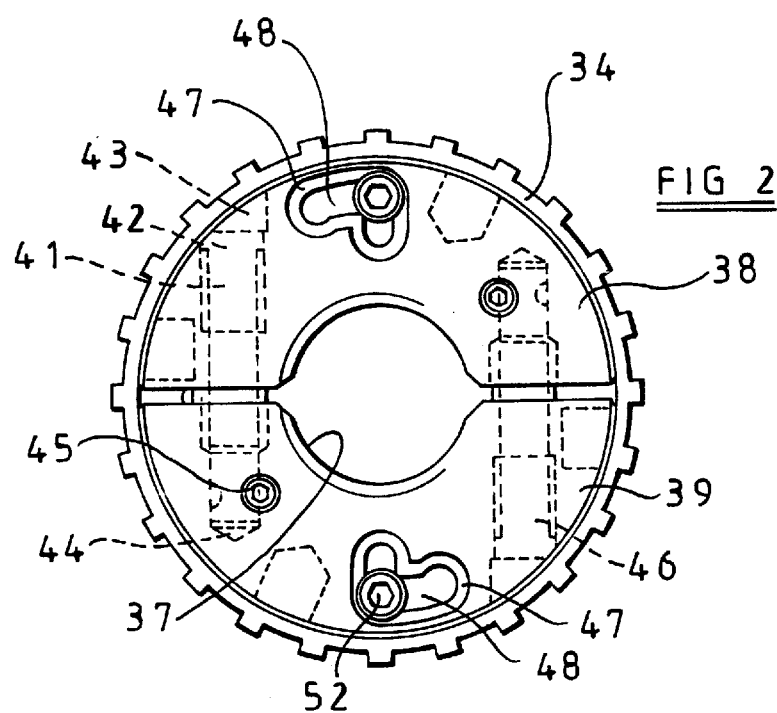
FIG. 2 is a transverse sectional view of a tensioning nut of the device of FIG. 1.

Referring to the drawings, the hydraulic bolt tensioning device comprises a generally cylindrical reaction member 11, arranged at one end to engage the surface 12 from which the bolt shank 13 to be tensioned protrudes in use. Extending axially into the reaction member 11 front said one end thereof is a recess 14 large enough to accommodate the conventional nut 15 engaged with the shank 13 in use. The wall of the reaction member 11 is provided with apertures 16 to permit manipulation of the nut 15 on the shank 13, conventionally by means of a tommy bar or the like.

A shank receiving bore 17 extends axially through the member 11 from the base of the recess 14 to the free end of the member 1. Thus, in use, the shank 13 can protrude completely through the member 11. The free end of the member 11 defines an annular surface 18 normal to the axis of the member 11 and extending from the surface 18 axially towards the opposite end of the member 11 is an annular chamber 19 which defines the cylinder of an hydraulic piston and cylinder arrangement. Thus the inner and outer walls of the chamber 19 are parallel cylindrical walls, and conveniently are coaxial with the bore 17.

Slidably disposed within the chamber 19, for axial movement relative to the member 11 is an annular piston 21 which protrudes from the surface 18 and includes an integral, annular spacer 22 in facial contact with the surface 18. A plurality of angularly spaced cap screws 28 extend axially through the annular piston 21 and secure an annular seal 24 to the lower end thereof, thus defining an annular, sealed, sliding, interface between the piston 21 and the chamber 19. The seal 24 is a tight-fit in the chamber 19, and thus the piston 21 is not readily moveable, but can be displaced axially by the introduction of hydraulic fluid under pressure between the seal 24 and the base of the chamber 19. The wall of the member 11 carries a union 25 for attachment to a controlled supply of hydraulic fluid under pressure and one or more drillings and/or gallerie; link the union 25 with the annular space defined between the seal 24 and the base of the chamber 19.

A cam ring 26 is defined by a metal annulus and is seated on the outer surface of the spacer 22. The central aperture of the cam ring 26 is of sufficiently large diameter to permit the bolt shank 13 to extend freely therethrough. Extending into the thickness of the cam ring 26 from the surface thereof remote from the spacer 22, is a frusto-conical recess 28 having its axis coextensive with the axis of the bore 17 and piston 21.

Figure 3:
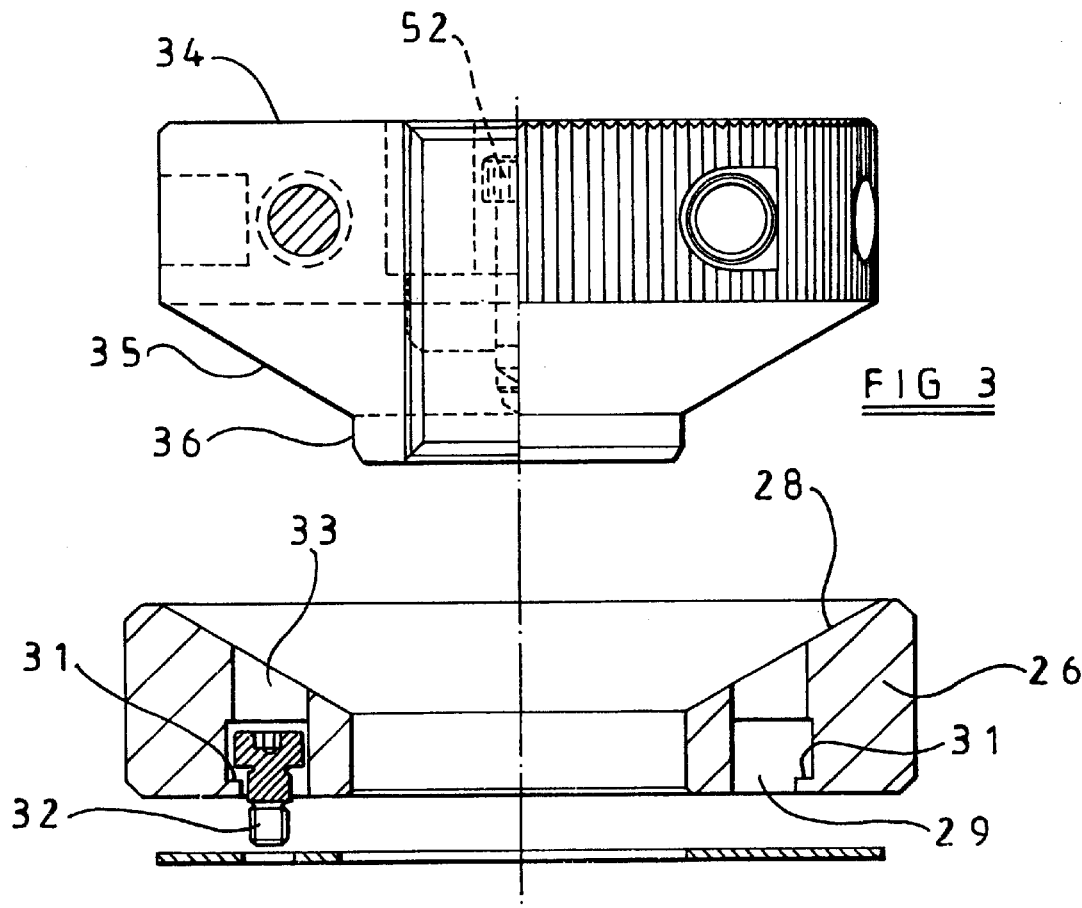
FIG. 3 is a side-elevational view, exploded, and partly in section of the tensioning nut and the cam ring of the device of FIG. 1.
Figure 4:
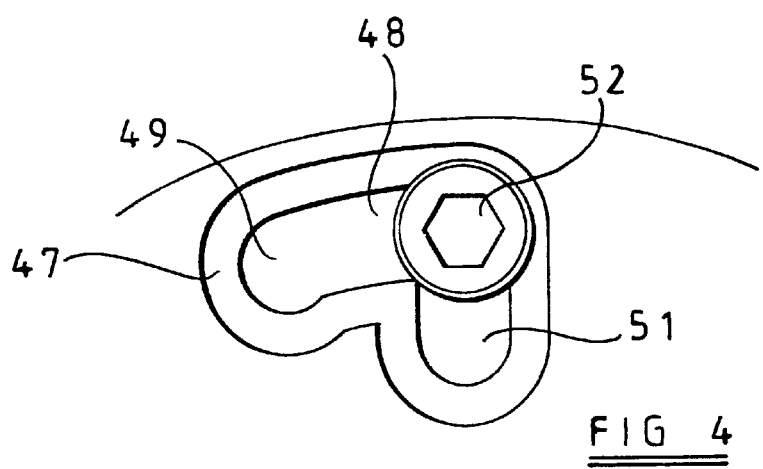
FIG. 4 is an enlarged plan view of part of a segment of the tensioning nut of FIG. 1.

The face of the cam ring 26 which is in sliding contact with the spacer 22 is formed with an annular channel 29 the outer cylindrical wall of which is undercut so as to define an inwardly presented shoulder 31. A, plurality of equiangularly spaced cap screws 32 extend upwardly from the spacer 22 and have their cylindrical heads received within the channel 29 such that the shoulder 31 extends beneath the cap screw heads thus rendering the cam ring 26 axially captive on the piston 21, but rotatable relative thereto about the common axis of the cam ring 26 and piston 21. Conveniently the cam ring 26 is formed with an axially extending through bore 33 (FIG. 3) aligned with the groove 29 and of a diameter greater than the diameter of the head of each cap screw 32. In order to assemble the cam ring 26 to the piston 21 the cam ring 26 is seated upon the spacer 22 and is rotated to align the bore 33 with a cap screw receiving hole in the spacer 22 and a cap screw is introduced through the bore 33 and screwed down until a shoulder on the shank of the cap screw sears on the surface of the spacer 22. The cam ring is then rotated to align the bore 33 with the next cap screw retaining hole in the spacer 22; the next cap screw is inserted in the same way, and the process is repeated for each of the cam ring retaining cap screws 32. The combined action of the cap screws 32 is to centre the ring 26 on the spacer 22 and thus centre the ring about the shank 13 in use.

A tensioning nut 34 of cylindrical form has a frusto-conical extension 35 at one axial end thereof the axis of the frustum being coextensive with the axis of the nut 34. The surface 35 of the nut is received in the recess 28 of the cam ring 26 and a short axial extension 36 of the nut, at the small diameter end of the frusto-conical surface 35, is rotatable, received in the central aperture of the cam ring 26 to assist the frusto-conical surface 35 and recess 28 in centring the nut 34 within the cam ring 26. The nut 34 has a through bore 37 threaded to mate with the screw-thread on the exterior of the shank 13 of the bolt to be tensioned. However, in order that it is not necessary to screw the nut 34 along the whole length of the shank 13 to its operative position in use, the nut 34 is sp it along a diameter to define first and second segments 38, 39.

A first metal slide pin 41 having an enlarged cylindrical head 42 extends within a stepped through bore 43 in the segment 38 and projects normal to the split face of the segments 38 and 39 to be received in a blind bore 44 in the segment 39. A transversely extending, removable, locking post 45 extends in an axial bore in the segment 39 and into a circumferential groove in the shank of the pin 41 to prevent withdrawal of the pin 41 from the segment 39. The spacing between the underside of the head 42 of the pin and the step in the bore 43 determines the maximum spacing which can achieved between the segment 39 and the segment 38. A similar pin and bore arrangement 46 links the segments 38, 39 on tile opposite side of the axis of the nut 34, the pin 46 being parallel to the pin 41, but being captive in the segment 38 and in sliding engagement with the segment 39. Thus although the nut 34 is formed in two halves the two halves are not detachable from one another but can be moved relative to one another between an open position in which the shank 13 of the bolt could pass freely through the central aperture of the nut, and a closed position in which the threaded regions of the segments 38, 39 mate with the thread on the shank 13 in use.

Each of the segments 38, 39 of the nut 34 is formed in its face remote from the frusto-conical surface 35, with a recess 47, the bases of the recesses 47 being coplanar, and normal to the axis of the nut. A slot 48 of generally L-shaped cross-section extends completely through each segment axially, from the base of each recess 47, the L-shaped slot is thus breaking through the frusto-conical surface 35 of each segment. One limb 51 of each slot 48 is disposed radially, the two limbs 51 being diametrically aligned. The other limb 49 of each slot 48 is part circular, having its centre of curvature on the axis of the nut 34, and extends in a counterclockwise direction (when viewed from the top face of the nut 34) from the respective limb 51. A respective cap screw 52 (FIG. 1) extends through each slot 48 and into screw-threaded engagement with the cam ring 26, aid has its respective head received within the respective recess 47.

When the nut 34 is in a rotated position relative to the cam ring 26 such that the shanks of the cam screws 52 are positioned at the junction of the portions 49 and 51 of their respective bore then it will be recognised that the segments 38, 39 of the nut 34 can be moved apart by an amount equal to the relationship between the diameter of the cap screw shank and the length of the portion 51 of each slot. This distance is chosen to be sufficient to allow the segments to move from a closed position in which their threads engage with the thread of the shank 13, and an open position in which the threads of the segments do not engage the shank 13. Similarly, when the segments 38, 39 are moved to their operative position to close around the shank 13 then the nut 34 can be rotated relative to the cam ring 26 so that the shanks of the cap screws 52 engage in the portions 49 of the slots 48 and thus lock the segments 38, 39 in their closed (operative) position engaging the shank 13 of the bolt to be tensioned. Desirably compression springs are interposed between the segments 38, 39 encircling the pins 41, 46 to urge the segments to their open position.

It is important to recognise that the segments 38, 39 of the nut 34 are linked by the pins 41, 46 to define a unit. Similarly, the cap screws 52 secure the nut 34 to the cam ring 26 which in turn is secured by the cap screws 32 to the piston 21. In turn, the piston 21 is secured to the reaction member 11 by the friction between the seal 24 and wall of the chamber 19. It follows therefore that the tensioning device can be handled and fitted to the shank 13 as a single unit. The unitary nature of the tensioning device has very significant benefits in that only a single unit needs to be transported, handled, and fitted when tensioning an existing bolt. This is of particular importance when the device is to be used sub-sea, for example by a diver working in dark and particularly inhospitable and inconvenient conditions. The fact that the diver need handle only a single unit when tensioning a bolt is of great benefit.

In use therefore when the tensioning device is in rest configuration the nut segments 38, 39 will be displaced as far as possible from one another, such that the cap screws 52 engage the innermost ends of the radial portions 51 of the slots 48. The device will be presented over the bolt shank 13 such that the shank 13 extends through the member 11, the cam ring 26 and the open nut 34, and when the end of the reactior member 11 is seated against the flange or body surface 12 concentrically around the shank 13 and the nut 15, the operator will simply press the nut segments 38, 39 towards one another to engage their threads on the thread of the shank 13 and will rotate the nut 34 relative to the cam ring 26 so that the cap screws 52 engage in the slot regions 49 so locking the nut segments in their closed position.

Next the operator will rotate the cam ring 26 relative to the piston 21 and the reaction member 11 in a clockwise direction. Since at this stage the cap screws 52 are engaged at the extreme ends of the portions 49 of the slots 48 the closed nut 34 will rotate with the cam ring 26 and thus will be screwed downwardly along the bolt shank 13 towards the surface 12, thus seating the frusto-conical surface 35 of the nut 34 in the recess 28 of the cam ring 26, pressing the cam ring 26 against the spacer 22, the spacer 22 against the member 11 and the member 11 against the surface 12. Thereafter, hydraulic fluid will be supplied under pressure through the union 25 to the chamber 19 beneath the seal 24 so displacing the seal 24 and piston 21 axially away from the surface 12. The pressure applied to the piston 21 to displace it axially from the reaction member 11 acts through the cam ring 26 and the nut 34 to tension the bolt shank 14. It will be recognised that the cam action of the frusto-conical surfaces 28, 35 serves to cause the nut segments to grip shank 13 more tightly.

When the shank 13 has been appropriately tensioned the nut 15 is manipulated by way of the apertures 16 in the member 11 to take up the amount by which the shank 13 has stretched, and to once again engage the surface 12.

Thereafter the hydraulic pressure between the piston 21 and the member 11 can be released and the cam ring 26 can then be rotated in a counterclockwise direction, carrying the nut 34 with it to provide sufficient axial clearance between the surfaces 35 and 28 for the nut 34 to be rotated relative to the cam ring 26 to bring the screw 52 into alignment with the slot portions 51 and for the segments 38, 39 to be moved apart so releasing their grip on the shank 13 and permitting the device to be removed from the now tensioned bolt simply by lifting the device axially from the bolt shank 13.

It will be recognised that while the cap screws 52 retain the nut 34 on the cam ring 26 there must be a predetermined clearance between the undersides of the cap screw heads and the base of their respective recess 47 in order to permit the axial movement of the segment 38, 39 relative to the cam ring 26 which occurs as the segments move outwardly to their open position and their frusto-conical regions 35 slide up the wall of the recess 28 of the cam ring.

It will be recognised that the seal 24 is sufficiently tight in the chamber 19 that the piston 21 will not be readily moveable manually relative to the member 11. Moreover in an arrangement where each nut segment is individually captive on the cam ring 26 then the linking of segments by means such as the pins 41, 46 could be dispensed with. However, such segment linking is of advantage during construction and servicing of the tensioning device so that the nut can still be handled as a unit after it has been disengaged from the cam ring.

It will be understood also that other forms of locking mechanism can be provided for holding the segments in their closed position relative to one another. For example the regions 49 of the slots 48 could be dispensed with, and a simple spring latch acting directly between the adjacent segments could be provided. Conveniently such a latch could be in the form of an elongate spring steel member fixed at one end to the segment 38 and engageable behind an appropriate shoulder on the segment 39 when the segments 38, 39 are in their closed position. In such an arrangement the slot regions 51 might be extended to break the outer periphery of their respective segments thus permitting the nut 34 to be removed from the cam ring without totally removing the cap screws 32.

It will also be understood that if desired the nut 34 could be divided into more than two segments although such an arrangement would necessitate a more complex arrangement for linking the segments to one another so that they can be handled as a unit when separate from the cam ring 26. Moreover the camming interface of the ring 26 and the rut 34 could be in the form of a curved, for example part-spherical, surface rather than the frusto-conical surfaces illustrated.

Figure 5:
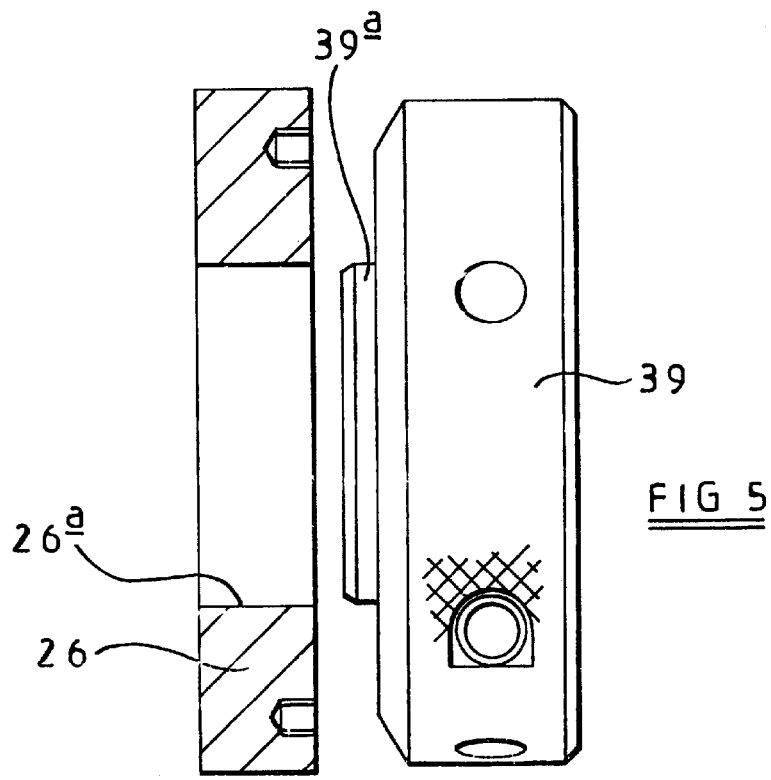
FIG. 5 is a view similar to FIG. 3 of a modification; aid.
Figure 6:
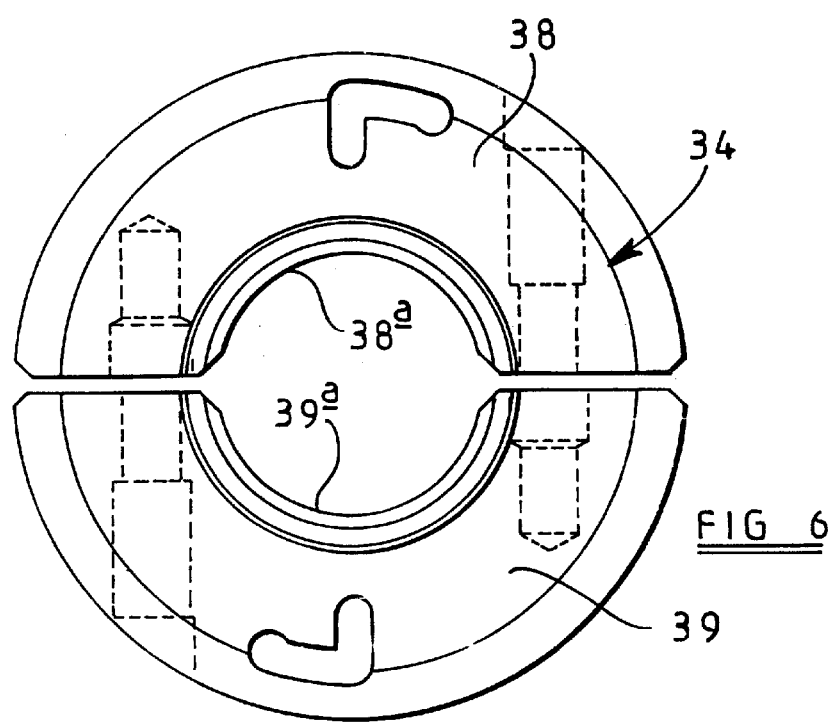
FIG. 6 is a plan view of the nut of FIG. 5.

FIGS. 5 and 6 illustrate a modification of the arrangement described above in which the frusto-conical cam surface 28 of the ring 26, and the frusto-conical surfaces 35 of the segments of the nut 34 are omitted.

While the cam action which tightens the nut segments about the shank 13 as the tensioning load is imposed on the shank 13, is extremely desirable, it is to be understood that there can be applications in which that tightening effect on the nut segments can be dispensed with.

Thus in the arrangement illustrated in FIGS. 5 and 6 the cam ring 26 is in effect a locking ring and has a plain cylindrical bore 26a therein. The nut segments 38, 39 each have a short extension indicated by the suffix a which, when the nut segments are closed against one another, define a short cylindrical extension capable of being received within the bore 26a as a close fit.

In operation, the nut segments 38, 39 are closed around the shank 13, and as the ring 26 is rotated, carrying the nut 34 with it, the nut 34 is moved axially, by the screw action of the nut on the shank, so that the short cylindrical extension defined by the parts 38a and 39a enters the bore 26a of the locking ring 26. Rotation is continued until the nut 39 seats against the surface of the ring 26, and thereafter any bursting load imposed upon the nut segments, as the shank of the bolt is tensioned, is accepted by the ring 26 owing to the close fit of the nut extension 38a, 39a in the bore 26a.

It will be recognised that in essence the operation of the modification illustrated in FIGS. 5 and 6 is substantially identical to that described above with reference to FIGS. 1 to 4 with the exception of the lack of a cam action increasing the tightness with which the nut segments grip the shank 13 as the bolt tensioning load increases.

The components of the device will be manufactured from materials suited to the loads and environment of the intended application. Sub-sea devices will usually be manufactured in stainless steel.

We claim:

1. An hydraulic, bolt tensioning device comprising a reaction component which in use bears against the member from which the bolt shank protrudes, the reaction component having a shank receiving bore extending therethrough, an annular, axially moveable component carried by said reaction component and moveable axially relative thereto by the introduction of hydraulic fluid under pressure between said components, a locking ring secured to said axially moveable component for axial movement therewith, and rotatable relative to said axially moveable component about the axis thereof, and, a tensioning nut secured to said locking ring for movement therewith, said tensioning nut being divided into at least two relatively displaceable segments moveable relative to said locking ring between an open position in which the shank of a bolt to be tensioned can pass freely between said segments, and an operative position in which the thread portions on said segments mate with the thread of said bolt shank, said locking ring cooperating with said nut segments when said nut segments are engaged with a bolt shank to hold the segments in said operative position.

2. An hydraulic, bolt tensioning device comprising a reaction component which in use bears against the member from which the bolt shank protrudes, the reaction component having a shank receiving bore extending therethrough, an annular, axially moveable component carried by said reaction component and moveable axially relative thereto by the introduction of hydraulic fluid under pressure between said components, a cam ring secured to said axially moveable component for axial movement therewith, and rotatable relative to said axially moveable component about the axis thereof, and, a tensioning nut secured to said cam ring for movement therewith, said tensioning nut being divided into at least two relatively displaceable segments moveable relative to said cam ring between an open position in which the shank of a bolt to be tensioned can pass freely between said segments, and an operative position in which the thread portions on said segments mate with the thread of said bolt shank, said cam ring cooperating with said nut segments when said nut segments are engaged with a bolt shank and said axially moveable member is moved axially in a direction to tension the bolt shank, to load the segments radially inwardly to grip the bolt shank.

3. An hydraulic, bolt tensioning device as claimed in claim 1 or claim 2, wherein there is provided means for retaining said nut segments in said operative position prior to the application of an hydraulic tensioning force.

4. An hydraulic, bolt tensioning device as claimed in claim 3, wherein said means comprises cooperating surfaces on said segments and said cam ring respectively.

5. An hydraulic, bolt tensioning device as claimed in claim 4, wherein said cooperating surfaces are on the segments, and or axially extending members protruding from the cam ring.

6. An hydraulic, bolt tensioning device as claimed in claim 4, wherein said means comprises a latch component secured to one segment and engageable with another segment when said segments are in their operative position.

7. An hydraulic, bolt tensioning device as claimed in claim 2, wherein there is provided means for retaining said nut segments in said operative position prior to the application of an hydraulic tensioning force.

8. An hydraulic, bolt tensioning device as claimed in claim 1, wherein said locking ring is interposed between said axially moveable component and said tensioning nut.

9. An hydraulic, bolt tensioning device as claimed in claim 2, wherein said locking ring is interposed between said axially moveable component and said tensioning nut.

10. An hydraulic, bolt tensioning device as claimed in claim 7, wherein said means comprises cooperating surface on said segments and said cam ring respectively.

11. An hydraulic, bolt tensioning device as claimed in claim 10 wherein said cooperating surfaces are on the segments, and on axially extending members protruding from the cam ring.

12. An hydraulic, bolt tensioning device as claimed in claim 10, wherein said means comprises a latch component secured to one segment and engageable with another segment when said segments are in their operative position.

* * * * *